(12) United States Patent
Bolisetty et al.

(10) Patent No.: US 11,934,676 B2
(45) Date of Patent: Mar. 19, 2024

(54) MEMORY COMMAND AGGREGATION TO IMPROVE SEQUENTIAL MEMORY COMMAND PERFORMANCE

(71) Applicant: Micron Technology, Inc., Boise, ID (US)

(72) Inventors: Naveen Bolisetty, Suryapet (IN); Peng Fei, Shanghai (CN); Yiran Liu, Boise, ID (US); Shakeel Bukhari, Cupertino, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 57 days.

(21) Appl. No.: 17/492,143

(22) Filed: Oct. 1, 2021

(65) Prior Publication Data

US 2023/0025508 A1 Jan. 26, 2023

(30) Foreign Application Priority Data

Jul. 21, 2021 (WO) ................ PCT/CN2021/107663

(51) Int. Cl.
*G06F 3/06* (2006.01)

(52) U.S. Cl.
CPC ............ *G06F 3/064* (2013.01); *G06F 3/0604* (2013.01); *G06F 3/0659* (2013.01); *G06F 3/0673* (2013.01)

(58) Field of Classification Search
None
See application file for complete search history.

(56) References Cited

U.S. PATENT DOCUMENTS

2006/0253621 A1* 11/2006 Brewer ................... G06F 3/067
710/40
2010/0262738 A1* 10/2010 Swing ................... G06F 3/0619
711/E12.001

(Continued)

FOREIGN PATENT DOCUMENTS

| CN | 112181280 A | 1/2021 |
| CN | 112306902 A | 2/2021 |

OTHER PUBLICATIONS

International Search Report and Written Opinion, PCT App. No. PCT/CN2021/107663, dated Apr. 24, 2022, 9 pages.

*Primary Examiner* — Stephanie Wu
(74) *Attorney, Agent, or Firm* — NICHOLSON DE VOS WEBSTER & ELLIOTT LLP

(57) ABSTRACT

A method is described, which includes receiving, by a memory subsystem controller from a host system, a host read memory command that references a set of logical block addresses associated with a set of transfer units of a memory device. The controller converts the set of logical block addresses to a set of physical block addresses for the set of transfer units; generates a set of device read memory commands based on the physical block addresses, wherein each device read memory command references at least one physical block address; and generates a first aggregated device read memory command based on a first device read memory command and a second read memory command in response to determining that the first device read memory command is associated with the second device read memory command. The controller thereafter transmits the first aggregated device read memory command to the memory device.

20 Claims, 6 Drawing Sheets

(56) References Cited

U.S. PATENT DOCUMENTS

| | | | |
|---|---|---|---|
| 2016/0139626 A1* | 5/2016 | Nowak | G06F 13/38 |
| | | | 713/401 |
| 2016/0154590 A1* | 6/2016 | Fan | G06F 3/0656 |
| | | | 711/118 |
| 2018/0074702 A1* | 3/2018 | Chen | G06F 3/0673 |
| 2018/0277180 A1 | 9/2018 | Yoshida | |
| 2020/0042242 A1 | 2/2020 | Byun | |
| 2020/0341686 A1* | 10/2020 | Lee | G06F 3/0655 |
| 2021/0389878 A1* | 12/2021 | Lindberg | G06F 3/0611 |
| 2022/0130438 A1* | 4/2022 | Jung | G11C 7/1063 |
| 2022/0197560 A1* | 6/2022 | Na | G06F 3/064 |

\* cited by examiner

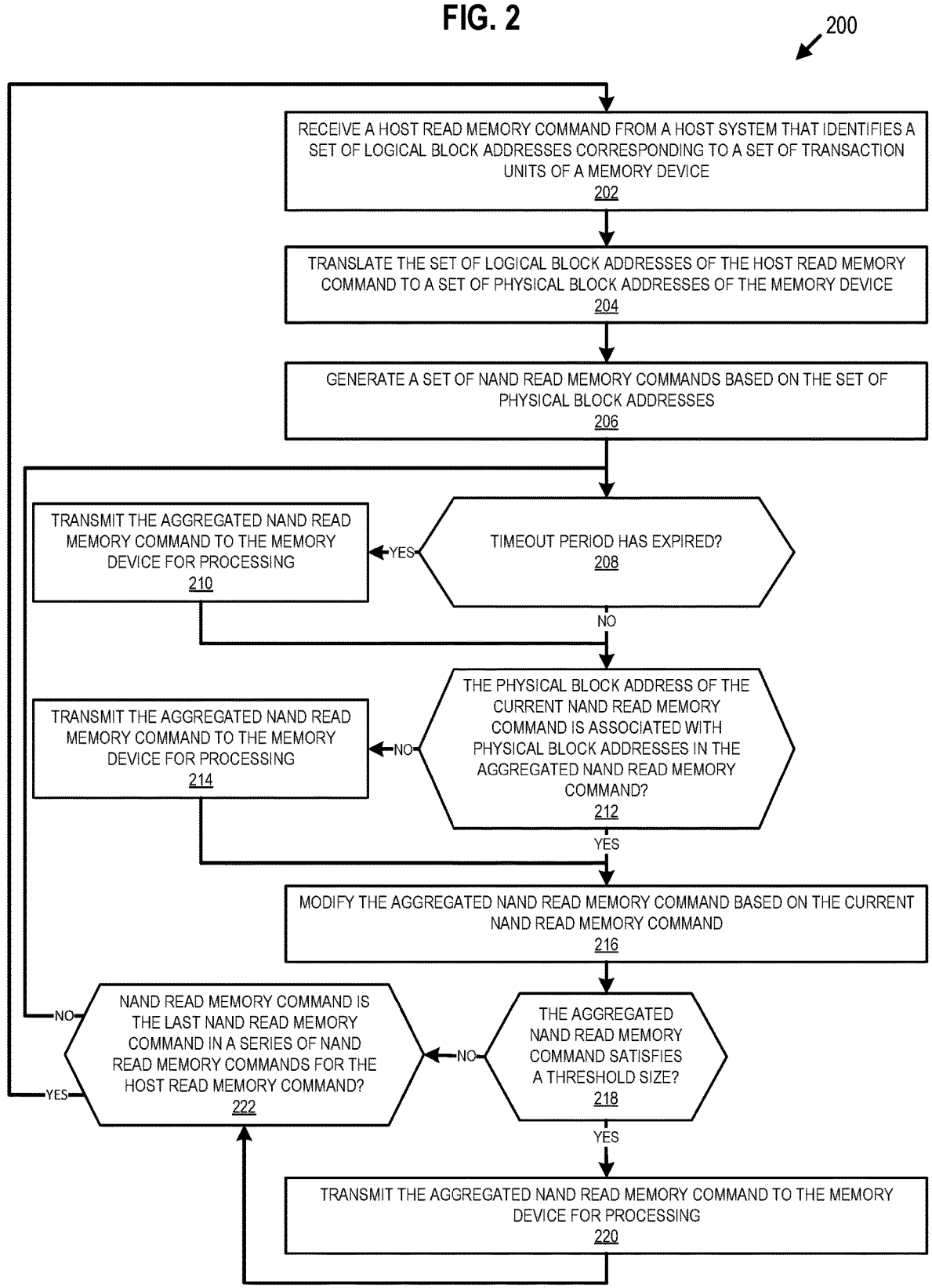

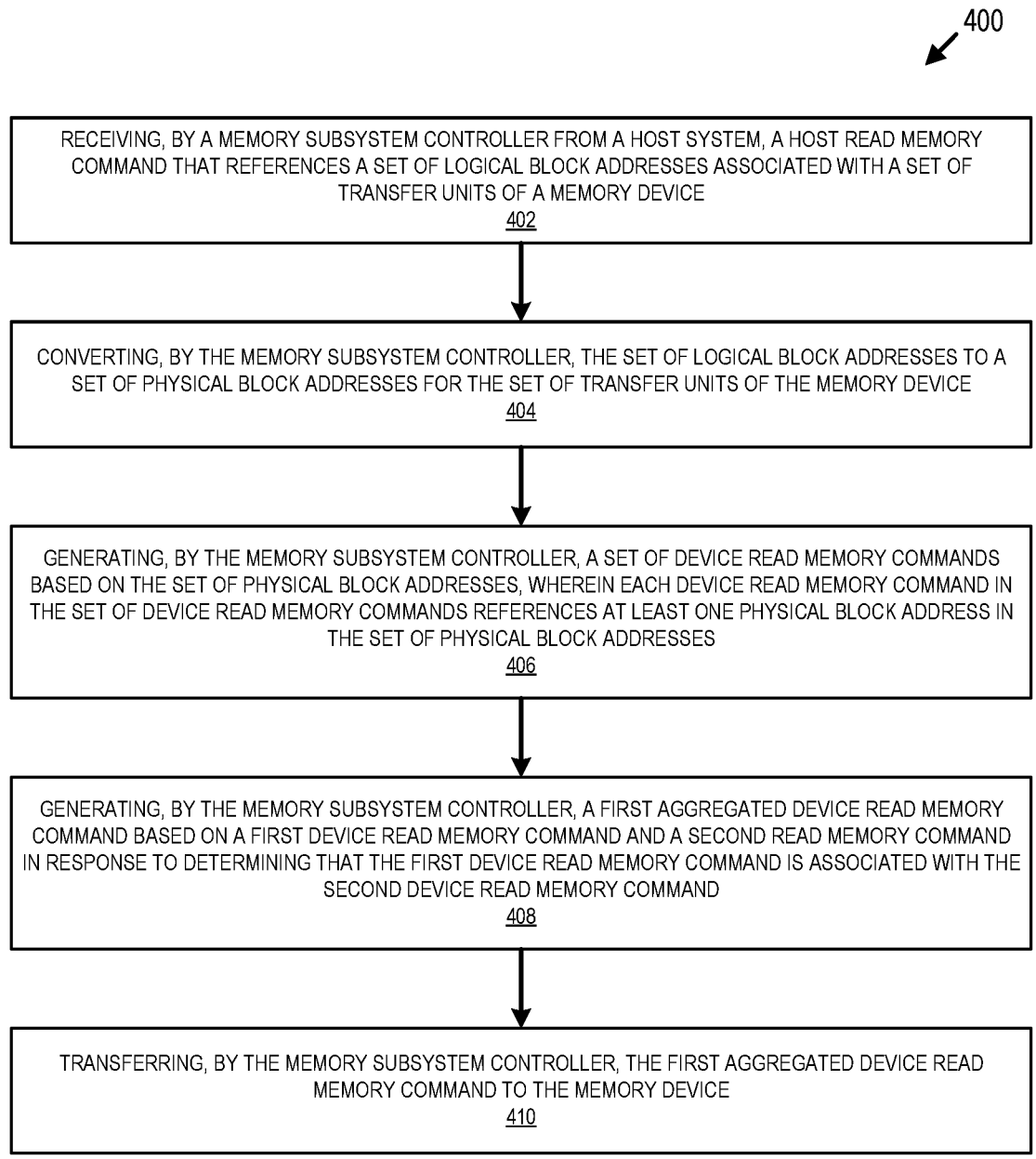

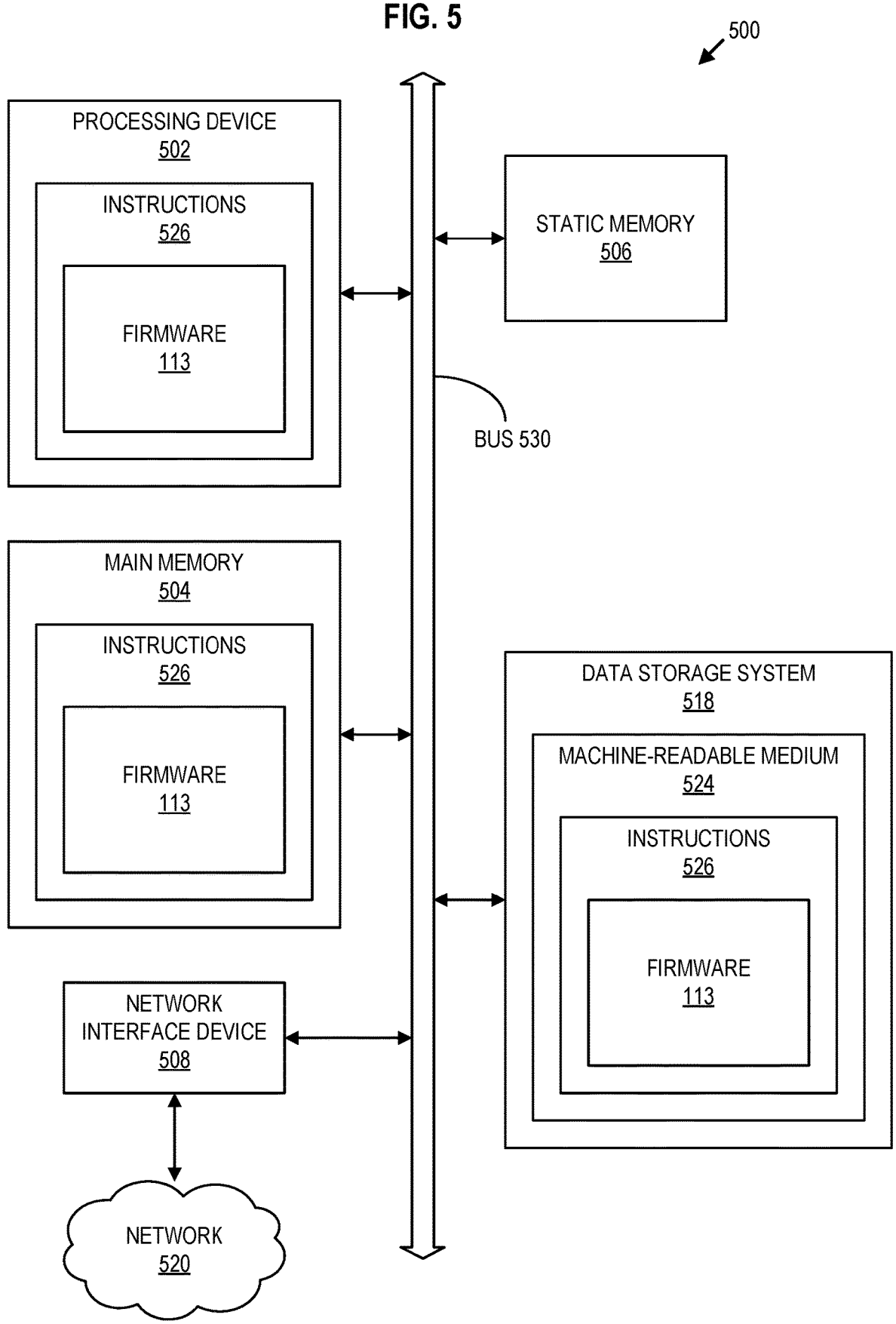

MEMORY COMMAND AGGREGATION TO IMPROVE SEQUENTIAL MEMORY COMMAND PERFORMANCE

CROSS-REFERENCE TO RELATED APPLICATION

The present application claims the benefit of International Application No. PCT/CN2021/107663 filed on Jul. 21, 2021, which is hereby incorporated by reference.

TECHNICAL FIELD

The present disclosure generally relates to memory command aggregation, and more specifically, relates to memory command aggregation to improve sequential memory command performance.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2 is a flow diagram of an example method to aggregate memory negative-and (NAND) commands, in accordance with some embodiments of the present disclosure.

FIG. 4 is a flow diagram of an example method to aggregate device read memory commands, in accordance with some embodiments of the present disclosure.

FIG. 5 is a block diagram of an example computer system in which embodiments of the present disclosure may operate.

DETAILED DESCRIPTION

Figure 1:
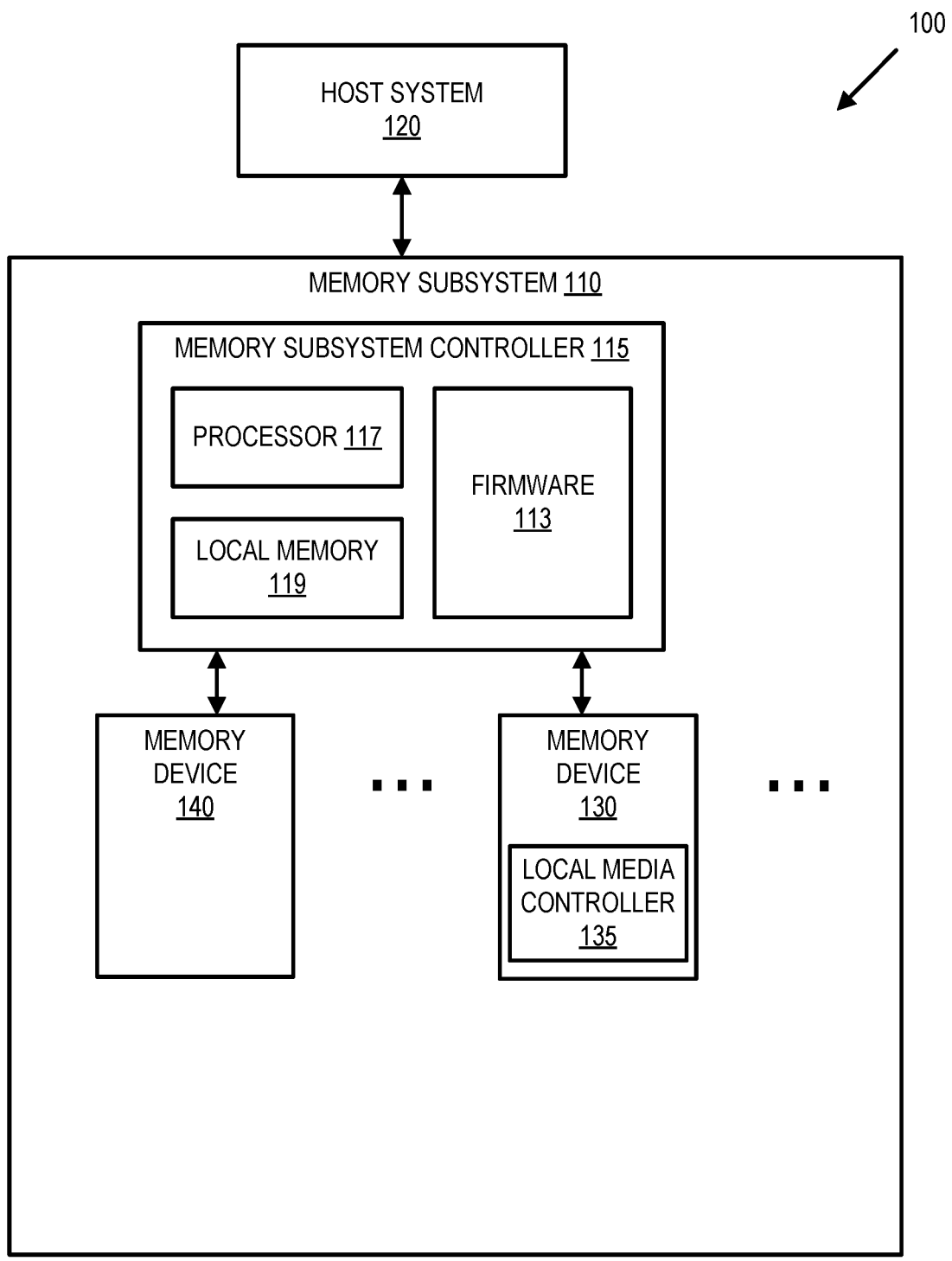
FIG. 1 illustrates an example computing system that includes a memory subsystem in accordance with some embodiments of the present disclosure.

Aspects of the present disclosure are directed to aggregating memory commands to improve sequential memory command performance in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of or otherwise include one or more logic units (LUN) and each LUN can consist of or otherwise include one or more planes. For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, a SLC can store one bit of information and has two logic states.

A memory subsystem can include a multilayer firmware that receives memory commands from a host system and translates these host memory commands to memory device commands. For example, a host system transmits a read memory command to a memory subsystem for accessing data in a NAND memory device (sometimes referred to as a NAND array). The host memory command can include a logical block address, which is used by the host system for indicating a start logical block address, and a run length, which indicates a number of sequential logical block addresses from the start logical block address. Once the host memory command is received by the memory subsystem, the host memory command can be converted by firmware of the memory subsystem into a set of lower-level commands for eventual use by the NAND memory device. In particular, the single host memory command can be translated into one or more NAND memory commands that are issued to the NAND memory device to access data. For example, a host memory command requesting 16 kilobytes of data can be translated into four NAND memory commands that each requests 4 kilobytes of data. This memory command amplification results in considerable processing overhead for the NAND memory device, which reduces throughput of the overall memory subsystem. In particular, each access to the memory device requires separate processing by the memory device and separate time to complete.

Aspects of the present disclosure address the above and other deficiencies by aggregating NAND read memory commands into a single aggregated NAND read memory command and transmitting the aggregated NAND read memory command to the NAND memory device for processing. For example, a host system transmits one or more host read memory commands to a memory subsystem, which includes firmware for processing/managing received host memory commands and the NAND memory devices that the host read memory commands seek to access data from. In one embodiment, a level of the firmware translates the host read memory commands into a set of NAND read memory commands. This can include the firmware translating a set of logical block addresses of the host read memory commands into corresponding physical block addresses of the NAND memory device and including these physical block addresses in set of the NAND read memory commands. For example, if a set of host read memory commands request 16 kilobytes of data to be read from four separate transfer units of the NAND memory device, the firmware can translate logical block addresses of the set of host read memory commands into four physical block addresses and generate separate NAND read memory commands for each of these physical block addresses. The generated NAND read memory commands are transferred to a lower level of the firmware where they are analyzed for aggregation. For example, the firmware 113 can determine if two or more of the four physical block addresses are within the same channel, die/LUN, and page of the memory device. Based on this association, the firmware 113 can aggregate the two or more physical block addresses into a single aggregated NAND read memory command. This single aggregated NAND read memory command (1) can represent multiple NAND read memory commands and (2) requires the same amount of time to process as a single NAND read memory command. In some embodiments, the single aggregated NAND read memory command is size-limited (e.g., a threshold number of physical block addresses can be represented by the single aggregated NAND read memory command) and/or aggregation is limited to a reoccurring timeout period to ensure data is returned to the host system without excess delay. Further details regarding the above outlined techniques will be described below.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM)

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes firmware 113 that can aggregate NAND memory commands according to one or more conditions. In some embodiments, the controller 115 includes at least a portion of the firmware 113. For example, the controller 115 can include a processor 117 (processing device) configured to execute instructions stored in local memory 119 for performing the operations described herein. In some embodiments, firmware 113 is part of the host system 110, an application, or an operating system.

The firmware 113 can aggregate NAND memory commands according to one or more conditions. Further details with regards to the operations of the firmware 113 are described below.

FIG. 2 is a flow diagram of an example method 200 to aggregate NAND memory commands, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the firmware 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 202, the processing device receives a host memory command from the host system 120. The host memory command can be a read memory command that indicates a set of logical block addresses corresponding to transfer units in the memory device 130/140 (e.g., a NAND memory device). The set of logical block addresses are part of a logical address space that is utilized by the host system 120 for processing/managing data stored in the memory device 130/140. For example, the host memory command can be a host read memory command that indicates a start logical block address and a run length, which indicates a number of sequential logical block addresses from the start logical block address. In this example, the host read memory command seeks to read data from transfer units of the memory device 130/140 associated with the set of logical block addresses and return this read data to the host system 120.

For purposes of illustration, the method 200 will be described in relation to a host read memory command. However, in other embodiments, the method 200 can be similarly performed for other memory commands, including write and erase memory commands that originate from the host system 120 or another source (e.g., memory commands that are internally generated by the memory subsystem 110 for purposes of garbage collection).

At operation 204, the processing device converts/translates the set of logical block addresses of the host read memory command to a set of physical block addresses of the memory device 130/140. In particular, as noted above, the host system 120 utilizes a logical address space for managing data stored in the memory device 130/140. The memory subsystem 110 can maintain a logical-to-physical table (or another similar mechanism), which maps logical block addresses used by the host system 120 to physical block addresses used by the memory device 130/140. For example, the firmware 113 translates the set of logical block addresses of the host read memory command to the set of physical block addresses using the logical-to-physical table. The set of physical block addresses directly identify transfer units within the memory device 130/140. In particular, a NAND memory device (e.g., the memory device 130) can be composed of a set of channels (e.g., four channels) and each channel is associated with a die (sometimes referred to or identified using as a logical unit number (LUN)). A channel is an independent communication mechanism between the memory subsystem controller 115 and the memory device 130/140. Accordingly, the number of channels dictate the number of dice/LUNs with which the memory subsystem controller 115 can communicate simultaneously. In this configuration, each die includes a set of planes (e.g., four planes in each die) and each plane includes a set of blocks. The number of planes in a die (e.g., 1, 2, 4, or 8) indicates the number of concurrent operations that can be executed on that die at a time. A block (sometimes referred to as a logical block) is the smallest erase unit on the memory device 130/140 and includes a collection of pages that are written sequentially. A transfer unit is the smallest size data chunk that is internally managed by the memory subsystem controller 115. In some embodiments, a transfer unit is composed of one or more blocks. Accordingly, the set of logical block addresses, which are translated into physical block addresses, are associated with a set of transfer units, which are themselves associated with one or more blocks.

At operation 206, the processing device generates a set of one or more NAND memory commands based on the set of physical blocks addresses. For example, the firmware 113 can generate a separate NAND read memory command for each physical block address in the set of physical blocks addresses. In some embodiments, the firmware 113 is composed of multiple hierarchical layers. Each of these layers can communicate or otherwise pass information to adjacent layers in the hierarchical structure. For example, a higher/upper layer of the firmware 113 can generate the one or more NAND read memory commands at operation 206, which will be passed to a lower layer for further processing before being transferred to the memory device 130/140. In some embodiments, the higher layer of the firmware 113 passes the NAND read memory commands to a lower layer of the firmware 113 together with metadata. For example, the metadata can include a hint regarding whether a particular NAND read memory command is the last in a sequence of NAND read memory commands (e.g., the last NAND read memory command in a sequence of NAND read memory commands that collectively will be used to fulfill a host read memory command).

At operation 208, the processing device determines if a timeout period has elapsed/expired. In particular, the timeout period is a period of time in which NAND read memory commands can be aggregated and are not being fulfilled for the host system 120 (e.g., data is not being read from the memory device 130/140 and returned to the host system 120). Instead, as will be described in greater detail below, during this timeout period, NAND read memory commands can be aggregated into an aggregated NAND read memory command and this aggregated NAND read memory command can thereafter be issued to the memory device 130/140 to fulfill a corresponding set of host memory commands. Accordingly, the timeout period begins at initialization of the memory subsystem 110 or upon an aggregated NAND read memory command being transmitted to the memory device 130/140, and reflects the period of time that aggregation can occur and, consequently, host read memory commands are not actively being fulfilled through processing by the memory device 130/140. In some embodiments, the timeout period can be statically set (e.g., the timeout period is 10 milliseconds (ms), 100 ms, 1 second, etc.) or can be adaptively/dynamically set. For example, the timeout period can be adaptively set/adjusted based on throughput performance (e.g., the timeout period can be lowered or raised to improve throughput performance). In response to determining that the timeout period has elapsed, the method 200 moves to operation 210.

At operation 210, the processing device transmits the aggregated NAND read memory command to the memory device 130/140 for processing. In particular, the aggregated NAND read memory command, which can represent one or more NAND read memory commands, is passed to the memory device 130/140 such that the memory device 130/140 can read data from corresponding transfer units of the memory device 130/140 and return the data to the requesting host system 120. In this fashion, the memory device 130/140 fulfills one or more host read memory commands based on the aggregated NAND read memory command. In some cases, the aggregated NAND read memory command can be empty upon arriving at operation 210 (i.e., no NAND read memory commands have been added to or otherwise represented by the aggregated NAND read memory command) In these cases, the processing device does not transmit the aggregated NAND read memory command to the memory device 130/140. Upon transmitting the aggregated NAND read memory command to the memory device 130/140 for processing or upon determining that the aggregated NAND read memory command is empty, the processing device can reset the timeout period at operation 210 to begin a new aggregated NAND read memory command (i.e., at this point, the aggregated NAND read memory command is empty).

Returning to operation 208, in response to determining that the timeout period has not elapsed, the method 200 moves to operation 212. At operation 212, the processing device determines if the physical block address of the next/current NAND read memory command (i.e., the NAND read memory command that is currently being processed by this run of operations 208-222) is associated with other physical block addresses in the aggregated NAND read memory command. In one embodiment, this association includes determining whether the physical block address of the current NAND read memory command is in the same channel, die, block, and page of the physical block addresses in the aggregated NAND read memory command. In this embodiment, the physical block address of the current NAND read memory command can be in the same plane or a different plane as the other physical block addresses in the aggregated NAND read memory command and still be considered associated, as long as the physical block address of the current NAND read memory command is in the same channel, die, block, and page as the physical block addresses in the aggregated NAND read memory command. Further, if the aggregated NAND read memory command is empty (i.e., does not include or otherwise reference any physical block addresses), the processing device determines that the physical block address of the current NAND read memory command is associated with other physical block addresses in the aggregated NAND read memory command.

In response to determining at operation 212 that the physical block address of the current NAND read memory command is not associated with other physical block addresses in the aggregated NAND read memory command, the method 200 moves to operation 214. In particular, the processing device transmits the aggregated NAND read memory command to the memory device 130/140 for processing. The processing device transmits the aggregated NAND read memory command such that a new aggregated NAND read memory command can be generated based on the current NAND read memory command and potentially one or more other NAND read memory commands that have yet to be processed. In some embodiments, operation 214 is performed in an identical or similar fashion to operation 210.

Figure 3A:
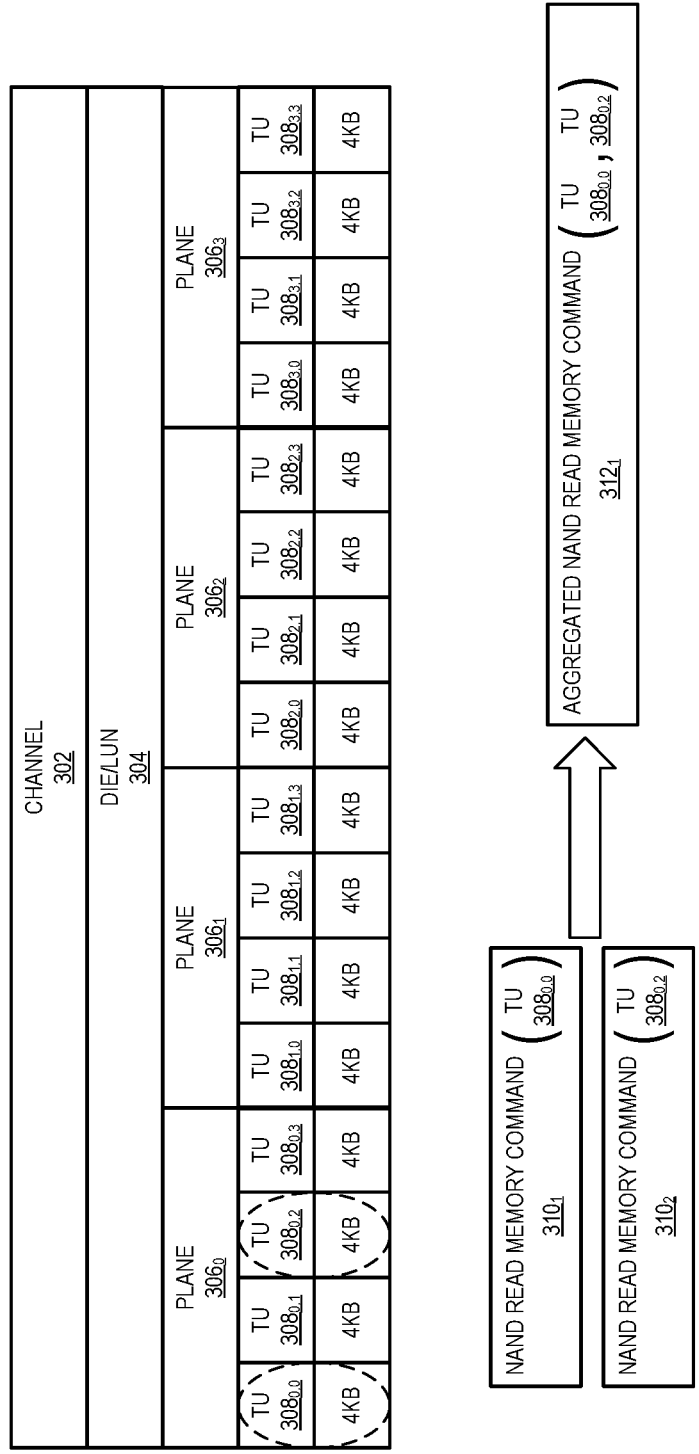
FIG. 3A shows two NAND read memory commands into a single aggregated NAND read memory command, in accordance with some embodiments of the present disclosure.
Figure 3B:
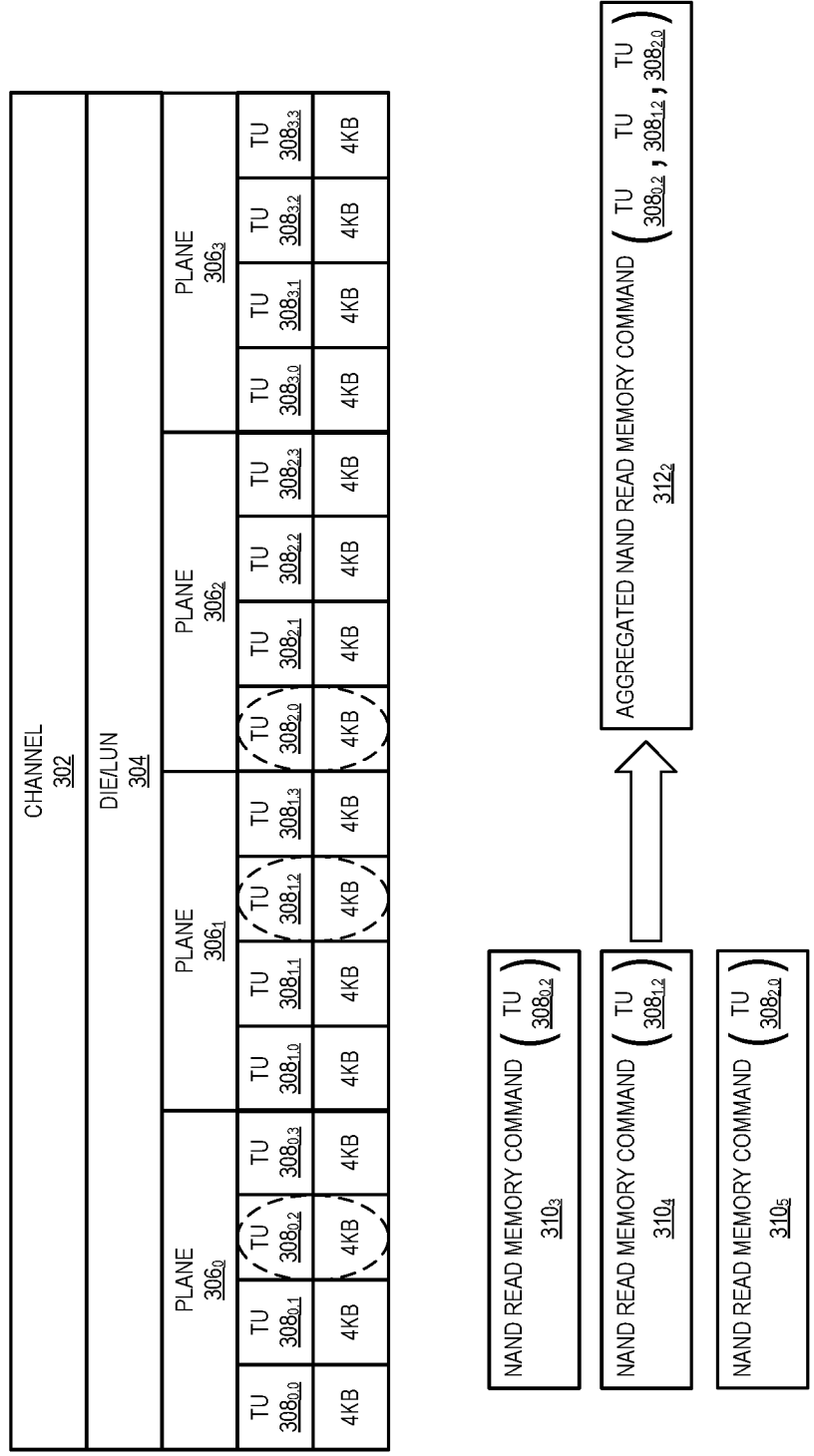
FIG. 3B shows three NAND read memory commands into a single aggregated NAND read memory command, in accordance with some embodiments of the present disclosure.

Following operation 214 or in response to determining at operation 212 that that the physical block address of the current NAND read memory command is associated with other physical block addresses in the aggregated NAND read memory command, the method 200 moves to operation 216. At operation 216, the processing device modifies the aggregated NAND read memory command based on the current NAND read memory command. In particular, the processing device modifies the aggregated NAND read memory command to include the physical block addresses represented or otherwise indicated by the current NAND read memory command. Accordingly, the aggregated NAND read memory command potentially represents multiple NAND read memory commands. For example, FIG. 3A shows a channel 302 with a corresponding die/LUN 304. The die 304 includes four planes $306_0$-$306_3$ and each plane 306 includes four transfer units (TUs) 308, which each store 4 kilobytes of data. In particular, plane $306_0$ includes the transfer units $308_{0,0}$-$308_{0,3}$, plane $306_1$ includes the transfer units $308_{1,0}$-$308_{1,3}$, plane $306_2$ includes the transfer units $308_{2,0}$-$308_{2,3}$, and plane $306_3$ includes the transfer units $308_{3,0}$-$308_{3,3}$. As shown in FIG. 3A, two NAND read memory commands $310_1$ and $310_2$ that reference transfer units $308_{0,0}$ and $308_{0,2}$, respectively. These NAND read memory commands $310_1$ and $310_2$ that seek to access data from the same plane $306_0$ are combined in a single aggregated NAND read memory command $312_1$. This single aggregated NAND read memory command $312_1$ can be passed to the memory device 130/140 for accessing corresponding data from the transfer units $308_{0,0}$ and $308_{0,2}$. In another example, FIG. 3B shows three NAND read memory commands $310_3$, $310_4$, and $310_5$ that reference transfer units $308_{0,2}$, $308_{1,2}$, and $308_{2,0}$, respectively. These NAND read memory commands $310_3$, $310_4$, and $310_5$ that seek to access data from separate planes $306_0$, $306_1$, and $306_2$, respectively, are combined in a single aggregated NAND read memory command $312_2$. Accordingly, multiple NAND read memory commands 310 can be processed with a single access/sense of the memory device 130/140 using a single aggregated NAND read memory command 312 (e.g., a single multi-plane read command can be used to access transfer units 308 across different planes 306 of the die 304). This combination or reordering of NAND read memory commands 310 both simplifies access to the memory device 130/140 (e.g., reduced number of commands sent to the memory device 130/140) and reduces time spent by the memory device 130/140 to read data (e.g., a single multi-plane read command consumes an equivalent amount of time as a single plane read command).

At operation 218, the processing device determines if the aggregated NAND read memory command satisfies a threshold size (e.g., equal to the threshold size). In particular, an aggregated NAND read memory command can include or otherwise represent a threshold number of physical block addresses. This threshold can be statically set (e.g., 8-64 physical block addresses) or dynamically adjusted (e.g., adjusted to increase throughput performance). In response to determining that the aggregated NAND read memory command meets a threshold size, the method 200 moves to operation 220. At operation 220, the processing device transmits the aggregated NAND read memory command to the memory device 130/140 for processing. In some embodiments, operation 220 is performed in an identical or similar fashion to operation 210.

Returning to operation 218, in response to determining that the aggregated NAND read memory command does not meet the threshold size, the method 200 moves to operation 222. At operation 222, the processing device determines if the current NAND read memory command is the last NAND read memory command in a series of NAND read memory commands. In particular, a series of NAND read memory commands can be generated to represent a single host read memory command. When this single host read memory command is processed at a higher layer of the firmware 113 and the set of NAND read memory commands is generated at operation 206, the higher layer of the firmware 113 can pass metadata (e.g., a hint) to a lower layer of the firmware 113 that indicates whether a particular NAND read memory command is a last NAND read memory command in the series of NAND read memory commands. In response to determining that the current NAND read memory command is not the last NAND read memory command in a series of NAND read memory commands, the method 200 moves to operation 208 to process the next NAND read memory command in the series of NAND read memory commands Conversely, in response to determining that the current NAND read memory command is the last NAND read memory command in the series of NAND read memory commands or following operation 220, the method 200 moves to operation 202 to process a new host read command.

Although described above in relation to processing NAND read memory commands corresponding to a single host read memory command, the method 200 can be performed concurrently for multiple host read memory commands corresponding to the same channel, die/LUN, and/or page or different channels, dice/LUNs, and pages.

FIG. 4 is a flow diagram of an example method 400 to aggregate device read memory commands, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the firmware 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 402, the processing device receives, from a host system 120, a host read memory command that references a set of logical block addresses associated with a set of transfer units of a memory device (e.g., the memory device 130/140). The set of logical block addresses are part of a logical address space that is utilized by the host system 120 for processing/managing data stored in the memory device 130/140. For example, the host read memory command indicates a start logical block address and a run length, which indicates a number of sequential logical block addresses from the start logical block address. In this example, the host read memory command seeks to read data from transfer units of the memory device 130/140 associated with the set of logical block addresses and return this read data to the host system 120.

At operation 404, the processing device converts the set of logical block addresses to a set of physical block addresses for the set of transfer units of a memory device. In particular, as noted above, the host system 120 utilizes a logical address space for managing data stored in the memory device 130/140. The memory subsystem 110 can maintain a logical-to-physical table (or another similar mechanism), which maps logical block addresses used by the host system 120 to physical block addresses used by the memory device 130/140. At operation 404, the firmware 113 translates the set of logical block addresses of the host read memory command to the set of physical block addresses using the logical-to-physical table. The set of physical block addresses directly identify transfer units within the memory device 130/140.

At operation 406, the processing device generates a set of device read memory commands (e.g., NAND read memory commands) based on the set of physical block addresses, wherein each device read memory command in the set of device read memory commands references at least one physical block address in the set of physical block addresses. For example, the firmware 113 can generate a separate device read memory command for each physical block address in the set of physical blocks addresses. In some embodiments, the firmware 113 is composed of multiple hierarchical layers. Each of these layers can communicate or otherwise pass information to adjacent layers in the hierarchical structure. For example, a higher/upper layer of the firmware 113 can generate the one or more device read memory commands at operation 406, which will be passed to a lower layer for further processing before being transferred to the memory device 130/140. In some embodiments, the higher layer of the firmware 113 passes the device read memory commands to a lower layer of the firmware 113 together with metadata. For example, the metadata can include a hint regarding whether a particular device read memory command is the last in a sequence of device read memory commands (e.g., the last NAND read memory command in a sequence of device read memory commands that collectively will be used to fulfill a host read memory command).

At operation 408, the processing device generates an aggregated device read memory command based on multiple read memory commands in response to determining that the multiple device read memory commands are associated. For example, the firmware 113 can determine if two or more of the four physical block addresses are within the same channel, die/LUN, and page of the memory device. Based on this association, the firmware 113 can aggregate the two or more physical block addresses into a single aggregated device read memory command. This single aggregated device read memory command (1) can represent multiple device read memory commands and (2) requires the same amount of time to process as a single device read memory command.

At operation 410, the processing device transfers the aggregated device read memory command to the memory device to fulfill the multiple second device read memory commands by reading data from the set of transfer units of the memory device. In particular, the aggregated device read memory command, which represents multiple device read memory commands is passed to the memory device such that the memory device can read data from corresponding transfer units of the memory device and return the data to the requesting host system 120. In this fashion, the memory device fulfills one or more host read memory commands based on the aggregated device read memory command Upon transmitting the aggregated device read memory command to the memory device for processing, the processing device can reset a timeout period to begin a new aggregated device read memory command (i.e., at this point, the aggregated device read memory command is empty).

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the firmware 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory subsystem 110 of FIG. 1.

In one embodiment, the instructions 526 include instructions to implement functionality corresponding to firmware (e.g., the firmware 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 200 and 400 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
receiving a host read memory command that references a set of logical block addresses associated with a set of transfer units of a memory device;
converting the set of logical block addresses to a set of physical block addresses for the set of transfer units of the memory device;
generating a set of device read memory commands based on the set of physical block addresses, wherein each device read memory command in the set of device read memory commands references at least one physical block address in the set of physical block addresses;
generating a first aggregated device read memory command based on a first device read memory command and a second device read memory command in response to determining that the first device read memory command is associated with the second device read memory command;
transferring, by a first level of firmware of a memory subsystem controller, metadata associated with the second device read memory command to a second level of firmware of the memory subsystem controller;
determine, by the second level of firmware of the memory subsystem controller, that the second device read memory command is a last in a series of device read memory commands based on the metadata; and
transferring, in response to the second level of firmware determining that the second device read memory command is the last in the series of device read memory commands, the first aggregated device read memory command to the memory device.

2. The method of claim 1, wherein the first device read memory command is associated with the second device read memory command when a first physical block address referenced by the first device read memory command is within a same channel, die, block, and page of the memory device as a second physical block address referenced by the second device read memory command.

3. The method of claim 2, wherein the first aggregated device read memory command is a multi-plane read memory command that reads data from separate planes of the same die.

4. The method of claim 1, further comprising:
generating a second aggregated device read memory command based on a third device read memory command and a fourth device read memory command in response to determining that the third device read memory command is associated with the fourth device read memory command; and
transferring, in response to determining that a size of the second aggregated device read memory command satisfies a threshold size, the second aggregated device read memory command to the memory device.

5. The method of claim 1, further comprising:
generating a second aggregated device read memory command based on a third device read memory command and a fourth device read memory command in response to determining that the third device read memory command is associated with the fourth device read memory command; and
transferring, in response to determining that a timeout period has expired, the second aggregated device read memory command to the memory device.

6. The method of claim 5, further comprising:
resetting the timeout period upon transferring the second aggregated device read memory command to the memory device;
generating, during the timeout period, a third aggregated device read memory command based on a fifth device read memory command and a sixth fourth device read memory command in response to determining that the fifth device read memory command is associated with the sixth device read memory command; and
transferring the third aggregated device read memory command to the memory device to fulfill the fifth device read memory command and the sixth device read memory command.

7. The method of claim 5, further comprising:
determining the timeout period based on a throughput of the memory device.

8. A non-transitory computer-readable storage medium comprising instructions that, when executed by a processing device, cause the processing device to:
receive a host read memory command that references a set of logical block addresses associated with a set of transfer units of a memory device;
convert the set of logical block addresses to a set of physical block addresses for the set of transfer units of the memory device;
generate a set of device read memory commands based on the set of physical block addresses, wherein each device read memory command in the set of device read memory commands references at least one physical block address in the set of physical block addresses;
generate a first aggregated device read memory command based on a first device read memory command and a second device read memory command in response to determining that the first device read memory command is associated with the second device read memory command;
transfer, by a first level of firmware of a memory subsystem controller, metadata associated with the second device read memory command to a second level of firmware of the memory subsystem controller;
determine, by the second level of firmware of the memory subsystem controller, that the second device read memory command is a last in a series of device read memory commands based on the metadata; and
transfer, in response to the second level of firmware determining that the second device read memory command is the last in the series of device read memory commands, the first aggregated device read memory command to the memory device.

9. The non-transitory computer-readable storage medium of claim 8, wherein the first device read memory command is associated with the second device read memory command when a first physical block address referenced by the first device read memory command is within a same channel, die, block, and page of the memory device as a second physical block address referenced by the second device read memory command.

10. The non-transitory computer-readable storage medium of claim 9, wherein the first aggregated device read memory command is a multi-plane read memory command that reads data from separate planes of the same die.

11. The non-transitory computer-readable storage medium of claim 8, wherein the processing device is further to:
generate a second aggregated device read memory command based on a third device read memory command and a fourth device read memory command in response to determining that the third device read memory command is associated with the fourth device read memory command; and
transfer, in response to determining that a size of the first aggregated device read memory command satisfies a threshold size, the second aggregated device read memory command to the memory device.

12. The non-transitory computer-readable storage medium of claim 8, wherein the processing device is further to:
generate a second aggregated device read memory command based on a third device read memory command and a fourth device read memory command in response to determining that the third device read memory command is associated with the fourth device read memory command; and transfer, in response to determining that a timeout period has expired, the second aggregated device read memory command to the memory device.

13. The non-transitory computer-readable storage medium of claim 12, wherein the processing device is further to:

reset the timeout period upon transferring the second aggregated device read memory command to the memory device;

generate, during the timeout period, a third aggregated device read memory command based on a fifth device read memory command and a sixth device read memory command in response to determining that the fifth device read memory command is associated with the sixth device read memory command; and transfer the third aggregated device read memory command to the memory device to fulfill the fifth-device read memory command and the sixth device read memory command.

14. The non-transitory computer-readable storage medium of claim 12, wherein the processing device is further to:

determine the timeout period based on a throughput of the memory device.

15. A system comprising:

a memory device; and a processing device, operatively coupled with the memory device, to:

receive a host read memory command that references a set of logical block addresses associated with a set of transfer units of the memory device;

generate a set of device read memory commands based on a set of physical block addresses associated with the set of logical block addresses, wherein each device read memory command in the set of device read memory commands references at least one physical block address in the set of physical block addresses that are generated based on the set of logical block addresses;

generate a first aggregated device read memory command based on a first device read memory command and a second device read memory command in response to determining that the first device read memory command is associated with the second device read memory command;

transfer, by a first level of firmware of a memory subsystem controller, metadata associated with the second device read memory command to a second level of firmware of the memory subsystem controller;

determine, by the second level of firmware of the memory subsystem controller, that the second device read memory command is a last in a series of device read memory commands based on the metadata; and transfer, in response to the second level of firmware determining that the second device read memory command is the last in the series of device read memory commands, the first aggregated device read memory command to the memory device.

16. The system of claim 15, wherein the first device read memory command is associated with the second device read memory command when a first physical block address referenced by the first device read memory command is within a same channel, die, block, and page of the memory device as a second physical block address referenced by the second device read memory command.

17. The system of claim 16, wherein the first aggregated device read memory command is a multi-plane read memory command that reads data from separate planes of the same die.

18. The system of claim 15, wherein the processing device is further to:

generate a second aggregated device read memory command based on a third device read memory command and a fourth device read memory command in response to determining that the third device read memory command is associated with the fourth device read memory command; and transfer, in response to determining that a timeout period has expired, the second aggregated device read memory command to the memory device.

19. The system of claim 18, wherein the processing device is further to:

reset the timeout period upon transferring the second aggregated device read memory command to the memory device, generate, during the timeout period, a third aggregated device read memory command based on a fifth device read memory command and a sixth device read memory command, in response to determining that the fifth device read memory command is associated with the sixth device read memory command, and transfer the third aggregated device read memory command to the memory device to fulfill the fifth device read memory command and the sixth device read memory command.

20. The system of claim 18, wherein the processing device is further to:

determine the timeout period based on a throughput of the memory device.

* * * * *